(12) United States Patent
Dingler

(10) Patent No.: US 8,543,865 B2
(45) Date of Patent: Sep. 24, 2013

(54) METHOD FOR COUPLING A CONTROL UNIT TO A PROGRAM FOR MODELING AN ACTIVE CHAIN DIAGNOSIS

(75) Inventor: Thomas Dingler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 823 days.

(21) Appl. No.: 11/632,586

(22) PCT Filed: Jul. 4, 2005

(86) PCT No.: PCT/EP2005/053161
§ 371 (c)(1),
(2), (4) Date: Jun. 26, 2007

(87) PCT Pub. No.: WO2006/005693
PCT Pub. Date: Jan. 19, 2006

(65) Prior Publication Data
US 2007/0288136 A1 Dec. 13, 2007

(30) Foreign Application Priority Data

Jul. 14, 2004 (DE) .......................... 10 2004 033 957
Aug. 26, 2004 (DE) .......................... 10 2004 041 216

(51) Int. Cl.
*G06F 7/00* (2006.01)
*G01R 31/317* (2006.01)
*G01R 31/3183* (2006.01)

(52) U.S. Cl.
USPC .......................................... 714/25; 701/31.4

(58) Field of Classification Search
USPC ............... 701/29, 31.4; 714/732, 745, E11.1
See application file for complete search history.

(56) References Cited

U.S. PATENT DOCUMENTS

| 5,455,929 A * | 10/1995 | Bosshart et al. ................ 703/15 |
| 5,515,384 A * | 5/1996 | Horton, III .................... 714/732 |
| 2002/0193925 A1 * | 12/2002 | Funkhouser et al. ........... 701/33 |
| 2003/0079158 A1 * | 4/2003 | Tower et al. .................... 714/23 |
| 2003/0125865 A1 * | 7/2003 | Yasui ............................ 701/109 |
| 2003/0144778 A1 * | 7/2003 | Miyano .......................... 701/29 |

FOREIGN PATENT DOCUMENTS

| DE | 100 38 094 | 2/2002 |
| EP | 0 442 277 | 8/1991 |

* cited by examiner

*Primary Examiner* — John Q Nguyen
*Assistant Examiner* — Rodney P King
(74) *Attorney, Agent, or Firm* — Kenyon & Kenyon LLP

(57) ABSTRACT

A method for coupling a control unit, in particular an engine control unit, for controlling a system, especially an engine, to a program for modeling an active chain diagnosis or to other programs for error analysis, having the following steps: within the scope of a first run, starting up an operating point of the system, generating an error and computing an intervention using a program for modeling the active chain diagnosis or the other programs for the error analysis, within the scope of a second run, resetting the control unit and deleting the error memory in the control unit, renewed starting up of the operating point, renewed applying of the error from the first run, carrying out the first intervention computed using the active chain diagnosis in the first run, and computing a second intervention using the program for modeling the active chain diagnosis, and within the scope of at least one additional run, resetting the control unit and deleting the error memory, renewed starting up the operating point, renewed application of the error, carrying out the intervention computed in preceding runs using the active chain diagnosis, and, if necessary, computing at least one additional intervention using the active chain diagnosis.

2 Claims, 1 Drawing Sheet

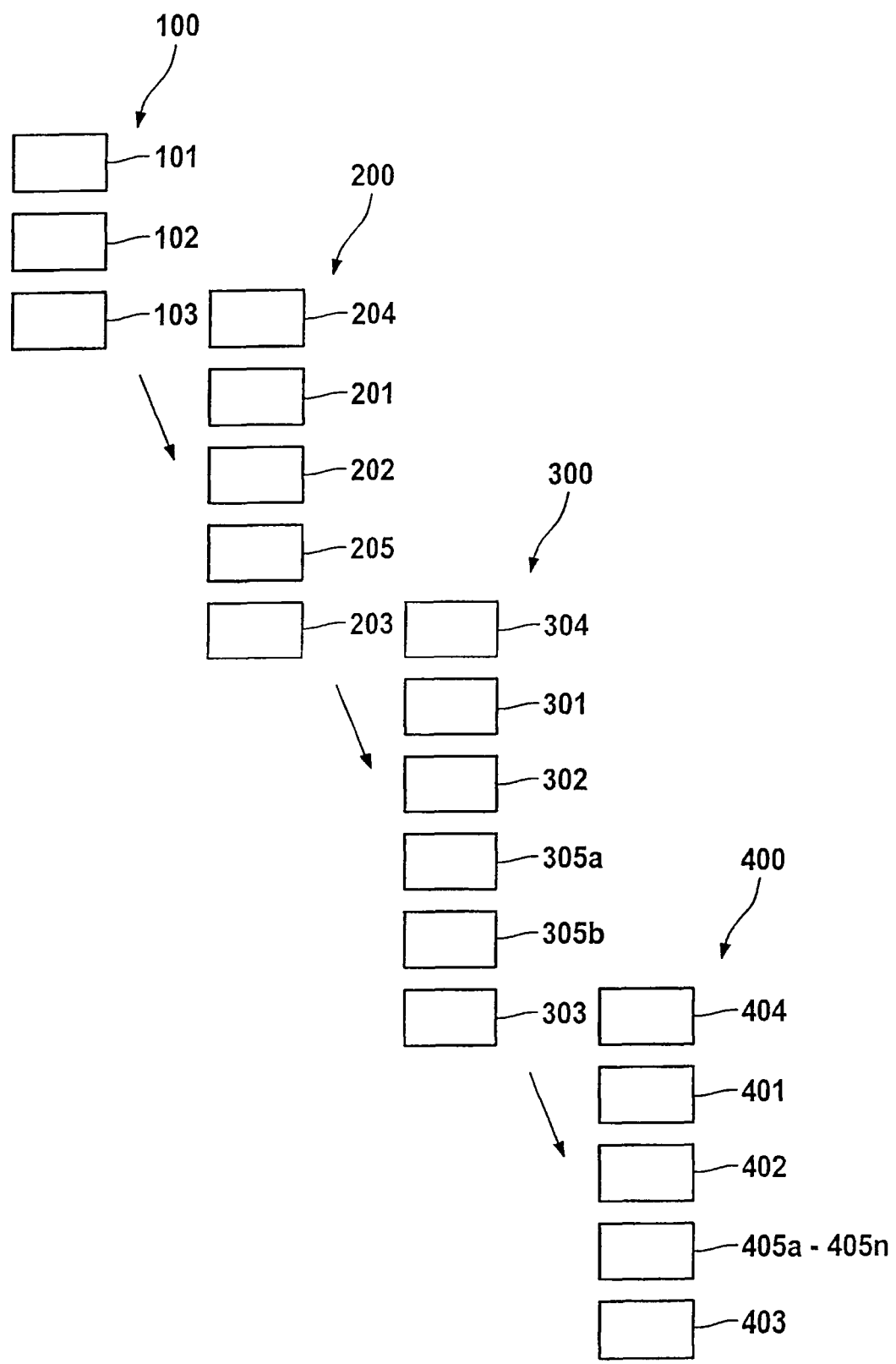

METHOD FOR COUPLING A CONTROL UNIT TO A PROGRAM FOR MODELING AN ACTIVE CHAIN DIAGNOSIS

FIELD OF THE INVENTION

The present invention relates to a method for coupling a control unit to a program for modeling an active chain diagnosis, that is, for generating diagnosis knowledge for a system diagnosis by simulating the nominal behavior and the error behavior The response routines gathered thereby may then be filed in a control unit and used for a quick error search, that is, limitation of the problem to a few suspected components.

BACKGROUND INFORMATION

Because of the increasing use of electronics, for instance, in the control of engines, especially in motor vehicles, error diagnoses are becoming steadily more costly. This makes it meaningful to investigate possible errors in the system, using a chain diagnosis running on an external computer. In order to be able to model such an active chain, it is known, for instance, that one may carry out a simulation of both systems (the system to be examined and the program for setting up the active chain) on a computer, an adjustment of the computing speeds being necessary in this case. This causes a very great expenditure, since both the control unit software and a model of the system have to be implemented on the computer. However, because of this, the system behavior is also influenced, so that the knowledge obtained can only be transferred conditionally to the original.

For the design approach to treating the problems going together with this, it is known that one may slow down the running of the faster system, for instance, via the CPU clock, while using an original control unit. On the other hand, it is possible, in a limited fashion, to speed up the running of the slower system, for instance, by making available more efficient computers. But the problem always remains that the original behavior is not achieved 100%, and a considerable adjustment expenditure is created.

SUMMARY OF THE INVENTION

The object of the present invention is the coupling of a control unit, for example, a control unit that is used in a motor vehicle for operating the engine, to a program for computing an active chain diagnosis (by this is understood an evaluation of sensor values and actuating variables in different operating states, for the error detection). The computing speeds in the modeling of the active chains are considerably slower than those of the control units. However, since interventions in the control unit, for instance for changing an operating point, by the active chain diagnosis as a function of sensor values and actuating variables are necessary, the running sequences of the control unit and the active chain diagnosis have to be synchronized.

The present invention attempts, for this purpose, to be able to use an (application) control unit without changing the usual hardware and software components.

This aim is achieved by a method, a computer program and a computer program product.

The simulation to be carried out within the scope of the method according to the present invention may advantageously be carried out using already present mass production software, and possibly only intervention places have to be cut free for the inputs of the control unit, in case these are not present anyhow. According to the present invention, synchronization problems, as used to occur, for example, when a software or a computer were stopped, are effectively avoided. The method according to the present invention proves to be particularly economical since a software code of the control unit does not have to be transmitted to an external computer.

The systems behavior that is computed or simulated according to the present invention, corresponds to the original behavior of the control unit. Hardware does not have to be adjusted to a slower running of the active chain diagnosis computation. An implementation of the method according to the present invention on any desired control unit variants/systems is possible without a problem.

Expediently, the run-through of the method according to the present invention takes place for an active chain diagnosis using n interventions correspondingly n+1 times. Using this procedure, an especially economical, and sufficiently exact modeling of the active chains is able to be implemented.

BRIEF DESCRIPTION OF THE DRAWING

The FIGURE shows a flow chart for representing a preferred specific embodiment of the method according to the present invention.

DETAILED DESCRIPTION

According to the preferred specific embodiment of the present invention shown in the FIGURE, it subdivides into four runs 100, 200, 300, 400. It should be noted that any number n of runs is conceivable, additional runs following the four runs shown in an analogous manner.

In a first step 101 of the first run, an operating point is started up by a control unit. This is especially implementable in that initial control signals (such as accelerator position, environmental temperature, engine temperature, etc.) are emitted to make available a setpoint operating state. Such a state may be specified by the statement of a plurality of operating parameters.

In a step 102, an error is subsequently applied. Such an error may, for instance, be the presence of a short circuit in a line, or a faulty sensor. It is also possible that an actuator is not reacting or not reacting correctly. Applying an error means, in particular, that the deviation with respect to a variable or an operating mode of a system controlled by the control unit is being generated, as opposed to a model.

In a step 103, sensor values and actuating variables are then recorded, and in an analysis program for the active chain diagnosis, an intervention in the control unit is computed from this.

However, since the modeling program for the active chain diagnosis computes too slowly with respect to the function of the control unit, the suitable point in time for the intervention in the control unit is exceeded. Therefore, the control unit is reset in a subsequent step 204 (beginning of second run 200), that is, it is reinitiated. Furthermore, the error memory of the control unit is deleted and the initial condition, i.e. the initial operating point selected in step 101 is reinstated or started up (step 201). It should be noted that corresponding steps of the respective runs 100-400 have the same last digits.

In step 202, the same error is now applied as in step 102, and in a subsequent step 205, the intervention computed in step 103 by the active chain diagnosis is executed. Using the data thus obtained, the active chain diagnosis is subsequently able to compute a second intervention in a following step.

The method shown will now be carried out in a third run 300, etc., similar method steps being designated by the same last digits, as was mentioned before. One may note that, in the third run, two steps (305a, 305b) are carried out to execute the computed interventions.

As many runs are executed as are necessary for the respective active chain diagnosis. Accordingly, in the nth run, n steps come about (designated symbolically by 405a-404n) for executing the computed interventions. Restarting the control units is always only necessary if the active chain diagnosis would like to react to the happening or intervene in it. Since the restart is able to take place during the computing of the active chain diagnosis, this method shown is applicable to almost all error cases without additional expenditure in time.

The step sequence shown may be composed of only a few groups of control signals for only a few runs, but a clearly greater number of runs may also be provided, perhaps of an order of magnitude of up to ten, twenty, fifty or one hundred. In efficient computers, a computation may also be carried out for a number of runs, of an order of magnitude of thousands to ten thousands. The method according to the present invention differs from usual controls particularly in that a large number of runs may be executed in which, in each case, the initial state is reinstated, while a next intervention of the active chain diagnosis is being computed.

In other words, using the method according to the present invention, the following steps are repeatedly executed: First, a control unit emits initial control signals to produce a setpoint operating state characterized by several operating parameters. Subsequently, the specified deviation in a system or in a model representing the system is introduced, and, based on this model, an actual operating state is represented that is different from the setpoint operating state. Subsequently, one after another, the respective control signals are emitted at the sequence generated up to the present, in order to transfer the system to sequential actual operating states or to represent sequential actual operating states.

During and at the end of the sequence of control signals, the actual operating state is recorded with the aid of sensor signals or emitted actuating variable signals, and, especially simultaneously, the sensor signals as well as the actuating variables are supplied to a computing unit, and, in the computing unit, control signals are ascertained from these signals which are added to the control signal sequence (run) at its end by the next run. There is always a resetting of the control unit to the above-mentioned setpoint operating state, so that the control unit is able, after each run, to emit initial control signals again for producing the setpoint operating state characterized by a plurality of operating parameters.

It should be noted that the control signals are able to be supplied to a model of the system or an actual system (e.g. an engine) at every point in time.

What is claimed is:

1. A method for operating an engine control unit for controlling an engine system using an active chain diagnosis for an error analysis, comprising:
within a scope of a first run, performing the following in sequence: specifying by the control unit a setpoint operating state of the system defined by a plurality of operating parameters of the system, affirmatively applying an error to the system, recording at least one of sensor values and actuating variables representing an actual operating state of the system, and computing by the active chain diagnosis a first intervention in the control unit using the at least one of the sensor values and the actuating variables recorded in the first run, wherein the first intervention includes at least one control signal for changing the actual operating state of the system;
within a scope of a second run subsequent to the first run, performing the following in sequence: resetting the control unit and deleting an error memory in the control unit, respecifying by the control unit the setpoint operating state of the system specified in the first run, affirmatively applying the error from the first run to the system, carrying out the first intervention computed in the first run, recording at least one of sensor values and actuating variables representing an actual operating state of the system, and computing by the active chain diagnosis a second intervention in the control unit using the at least one of the sensor values and the actuating variables recorded in the second run, wherein the second intervention includes at least one control signal for changing the actual operating state of the system; and
within a scope of at least one additional run subsequent to the second run, performing the following in sequence: resetting the control unit and deleting the error memory, respecifying by the control unit the setpoint operating state of the system specified in the first run, affirmatively applying the error from the first run to the system, carrying out the first and second interventions computed in the first and second runs, recording at least one of sensor values and actuating variables representing an actual operating state of the system, and computing by the active chain diagnosis at least one additional intervention in the control unit using the at least one of the sensor values and the actuating variables recorded in the at least one additional run, wherein the at least one additional intervention includes at least one control signal for changing the actual operating state of the system.

2. A method for operating an engine control unit for controlling an engine system by coupling the engine control unit with an external computing unit performing an active chain diagnosis for an error analysis, the method comprising:
within a scope of a first run, performing the following in sequence: specifying by the control unit a setpoint operating state of the system defined by a plurality of operating parameters of the system, affirmatively applying an error to the system, recording at least one of sensor values and actuating variables representing an actual operating state of the system, and computing by the active chain diagnosis a first intervention in the control unit using the at least one of the sensor values and the actuating variables recorded in the first run, wherein the first intervention includes at least one control signal for changing the actual operating state of the system;
within a scope of a second run subsequent to the first run, performing the following in sequence: resetting the control unit and deleting an error memory in the control unit, respecifying by the control unit the setpoint operating state of the system specified in the first run, affirmatively applying the error from the first run to the system, carrying out the first intervention computed in the first run, recording at least one of sensor values and actuating variables representing an actual operating state of the system, and computing by the active chain diagnosis a second intervention in the control unit using the at least one of the sensor values and the actuating variables recorded in the second run, wherein the second intervention includes at least one control signal for changing the actual operating state of the system; and
within a scope of at least one additional run subsequent to the second run, performing the following in sequence: resetting the control unit and deleting the error memory, respecifying by the control unit the setpoint operating state of the system specified in the first run, affirmatively applying the error from the first run to the system, carrying out the first and second interventions computed in the first and second runs, recording at least one of sensor values and actuating variables representing an actual operating state of the system, and computing by the active chain diagnosis at least one additional intervention in the control unit using the at least one of the sensor values and the actuating variables recorded in the at least one additional run, wherein the at least one additional intervention includes at least one control signal for changing the actual operating state of the system.

\* \* \* \* \*

UNITED STATES PATENT AND TRADEMARK OFFICE
CERTIFICATE OF CORRECTION

PATENT NO.        : 8,543,865 B2                                    Page 1 of 1
APPLICATION NO.   : 11/632586
DATED             : September 24, 2013
INVENTOR(S)       : Thomas Dingler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this
Fifteenth Day of September, 2015

Michelle K. Lee
*Director of the United States Patent and Trademark Office*